US005151579A

United States Patent [19]

Maginness

[11] Patent Number: 5,151,579

[45] Date of Patent: Sep. 29, 1992

[54] METHOD OF CHECKING CORRELATION BETWEEN PARTS OF A PHOTOFINISHING ORDER THROUGH THE USE OF ERROR WEIGHTS

[75] Inventor: Maxwell G. Maginness, Redmond, Wash.

[73] Assignee: Gregtag Systems, Inc., Bothell, Wash.

[21] Appl. No.: 528,743

[22] Filed: May 24, 1990

[51] Int. Cl.[5] .................. G06F 15/46; G06K 7/01

[52] U.S. Cl. .................. 235/375; 235/376; 235/437

[58] Field of Search .................. 371/5.1, 5.5, 53, 37.1, 371/43; 382/1, 8, 57; 364/581; 235/375, 376, 437, 438, 462, 470

[56] References Cited

U.S. PATENT DOCUMENTS

| | | | |
|---|---|---|---|
| 3,544,776 | 12/1970 | Fischer | 371/53 |
| 4,110,735 | 8/1978 | Maxemchuk | 371/43 |
| 4,194,685 | 3/1980 | Hill et al. | 235/375 |
| 4,207,814 | 6/1980 | Schenk | 235/437 |
| 4,369,512 | 1/1983 | Brossard et al. | 371/43 |
| 4,574,692 | 3/1986 | Wahli . | |
| 4,760,574 | 7/1988 | Budworth et al. . | |
| 4,791,279 | 12/1988 | Signoretto | 235/375 |
| 4,802,231 | 1/1989 | Davis | 382/57 |
| 4,823,162 | 4/1989 | Renn et al. | 235/375 |
| 4,958,379 | 9/1990 | Yamaguchi et al. | 382/57 |
| 4,961,086 | 10/1990 | Takenaka | 235/462 |
| 5,012,073 | 4/1991 | Hewitt et al. | 235/375 |

*Primary Examiner*—Robert Weinhardt

*Attorney, Agent, or Firm*—Christensen, O'Connor, Johnson & Kindness

[57] ABSTRACT

A method and apparatus for checking the correlation between all parts of a photofinishing order includes reading the identification numbers on at least some of the parts of the order using an optical character reader. The method includes processing the information received from the optical character reader to compensate for the inherent characteristics of optical character readers to misread portions of the numbers and includes a method of filtering misread and nonread information to prevent false alarm conditions in which an apparent mismatch is actually a misread, while minimizing the number of actual mismatches that are allowed through the system without causing an alarm. In one embodiment, a portion of the information is obtained in bar code form and a memory device is loaded with a table of bar code and optical character reader information for each order to maintain correlation between the order parts. The method includes the steps of assigning different error weights to various digits of the identification number and summing the error weights to determine when the sum exceeds a predetermined sum that will trigger an operator intervention alarm.

11 Claims, 3 Drawing Sheets

METHOD OF CHECKING CORRELATION BETWEEN PARTS OF A PHOTOFINISHING ORDER THROUGH THE USE OF ERROR WEIGHTS

BACKGROUND OF THE INVENTION

This invention relates to a method and apparatus for ensuring that the separate parts of a film-developing order in a commercial photofinishing laboratory are reunited after processing so that they can be delivered to the proper customer. More particularly, the invention relates to a method and apparatus that utilize an optical character reader to read identifying numbers printed on the parts of the order. The numbers are checked for correct matching to ensure that the correct parts of the same order are gathered together for delivery to the customer. Part of the invention is a method by which the detection system for initiating an alarm condition in the event of a mismatch is adjusted to compensate for the characteristics of optical character reading so as to filter out erroneous findings of a mismatch and reduce the number of false alarm readings that would otherwise occur.

In a typical commercial photofinishing laboratory customer orders are received in an envelope bearing the name and address of the customer as well as an identification of the delivery point, for example, a local drugstore or supermarket or other outlet at which the customer drops off the order. Typically, the order consists of a roll of exposed film that is to be developed at the photofinishing laboratory, printed as photographic prints according to the wishes of the customer, and then returned to the customer by way of the outlet at which the customer initially dropped off the order. Since the film must be removed from the envelope that it came in, in order to be developed, and since the envelope is the only source of information as to the customer and dealer name and address, it is necessary to maintain some correlation between the film and the envelope as they each proceed through the processing steps so that, at the end of the processing steps, the developed film and the prints made from it can be reunited with the envelope for proper return. It is also necessary, of course, to maintain correlation between the developed film and the prints made from that film to ensure that the proper prints are returned to the customer along with the developed negatives.

The primary method of maintaining correlation between the envelopes, film, and prints of a given photofinishing order has been to divide incoming work into manageable batches and then maintain a constant sequence of orders as they are processed so that, as long as the envelopes, film, and prints are removed from the batch in the same sequence in which they were entered, the correlation will be maintained. There are, however, several steps in the process, and requirements to remove damaged materials, which could lead to a change in sequence of one or all of the various parts of the order that would lead to a mixup in the final assembly of the parts of the order, if only sequence were relied upon for a match. It has been known for a long time to mark some identifying indicia on both the envelope and the film at the time they are received so that that indicia can then be checked prior to reassembly of the order and its return to the customer to ensure a proper match of film to envelope. Further, U.S. Pat. No. 4,574,692 to Wahli discloses a method by which the indicia for confirming a match of parts of the order is extended to marking of the prints so that a three-way match between envelope, film, and prints is checked upon reassembly of the order and prior to delivery of the order to the customer. As various matching methods and marking methods have evolved, the matching has been done at first by human operators and, more recently, through machine-readable indicators. Due to the accuracy with which they can be rapidly scanned, the state of the art has progressed primarily to a use of bar codes for encoding an identifying number on the film splice that holds various strips of film together during processing and on the order envelope, as well as sometimes on the reverse side of the prints belonging to an order. These bar codes are then scanned at some point prior to reassembly of the order to ensure that the correct parts of the order have been assembled.

While possible, as shown in U.S. Pat. No. 4,823,162 to Renn et al., it is difficult to accurately print bar codes on the splice tape as it is applied to each film order splice. Also, bar code printers of the type that would be necessary to achieve accurate reproduction of the code on the splice tape are expensive. Consequently, the industry has progressed in the direction of using preprinted barcoded splice tapes. The preprinted tapes add a significant amount to the overall cost of running the processing lab. Although the extra per-splice cost is small, the high volume that most commercial laboratories process, when multiplied by this small incremental cost, yields a large increase in the cost of laboratory operations. Bar code scanners suitable for film splice reading are also costly.

The advantage to using bar codes is a high percentage of accuracy of reading, which permits the use of a "hard coding" system; by this is meant that any mismatch reported as a result of the bar code scanning of the identifying numbers is regarded as correct information and leads to a shutdown of the system and a check by the operator. Even in the systems using preprinted barcoded splice tapes and bar-coded identifying numbers on the order envelopes, a human-readable version of the bar-coded number is present in both those locations to allow for human backup of the system. Therefore, numbers that could be utilized in one or more locations for scanning by an optical character reader as an alternative to the bar code reading, are present but are not used. Of course, with optical character reading it is no longer necessary to have bar-coded identifying numbers on the splice tapes, thus removing the extra cost imposed either by preprinting or applying these numbers during splicing. Only the human-readable number need be applied.

One of the existing problems in using an optical character reader to read the identifying numbers on the various parts of the film order is that typically a higher percentage of misreads, as well as nonreads, occurs than in using a bar code scanner and, therefore, mismatches are indicated by the system when, in fact, the match is correct but one or more of the identifying numbers has been incorrectly read. Therefore, in order to implement a system using optical character readers, it is necessary to develop a system that accounts for the greater percentage of misreads that will occur when using an optical character reader on human-readable numbers and by adjusting the alarm system, which is triggered by apparent mismatches in the system, to reduce the number of false alarms that would otherwise interrupt the workflow of the processing lab.

A method of dealing with a false alarm situation is disclosed in U.S. Pat. No. 4,760,574, Budworth et al.; however, the Budworth et al. system is primarily concerned with readability of the bar code and treats any situation in which the bar code is not readable as presenting an error of equal weight. In the situation in which an optical character reader is used, it is necessary to consider not only nonreadability but, also, an apparent mismatch that may be caused not by an actual mismatch but a misread of the number by the system.

SUMMARY OF THE INVENTION

The present invention provides a method for checking the correlation between all parts of a photofinishing order during the processing of that order. In carrying out the method some or all parts of the order are provided with a common multidigit number in standard human-readable form, and the number on each part of the order so marked is read using an optical character reader. Where they are economically provided, bar-coded numbers may be used for some of the identifying locations on parts of the order. This particularly applies to customer order envelopes. Since these numbers are arbitrary in the sense of arriving with the flow of envelopes, it is then necessary to create and maintain a table of correspondence between the usually sequential numbers assigned by the splicer for printing on the film splices in human-readable form and the randomly varying envelope numbers. Although arriving randomly, the same numbers will not appear twice if the data recorded includes both individual envelope and dealer identification. Since both of these are printed in bar code on the envelope as established practice, no additional cost is incurred by the finishing laboratory.

In order to compensate for apparent mismatches that are actually caused by nonreads of a digit by the optical character reader, a nonread error weight is assigned to each digit according to its position in the number. The most frequently changing digit will be weighted more than the least frequently changing digit. In a preferred embodiment of the invention the most frequently changing digit will be the least significant digit and will, therefore, be weighted to a greater degree than the more significant digits. After the numbers are read by the optical character reader, the numbers are compared for each part of the order. The number of nonreads is monitored and the error weights related to nonreads is summed in an order-by-order running total. If the running total of nonread error weights reaches or exceeds a predetermined sum, corrective action is initiated in the processing system.

In a further embodiment of the invention an error weight is also assigned to each digit to account for mismatches in the digits in the numbers read from each part of the order. The mismatch errors are also totalled and corrective action can be initiated if the sum of the mismatch error weights exceeds a predetermined sum.

Preferably, the nonread error weight sum and the mismatch error weight sum are decreased by a predetermined increment each time a subsequent correct match occurs to act as a reset of the system, since each time a correct match occurs the probability is that the matches preceding it were correct as well, due to the sequential handling of the parts of the order.

In more refined embodiments of the invention, error weights can be assigned to digits based on their frequency of occurrence as well as their frequency of change and certain mismatches can be given greater or lesser weight based on the probability of a misread occurring between particular pairs of digits, such as "3" and "8", "1" and "7", "6" and "9", based on the operational characteristics of optical character readers.

The apparatus for carrying out the above method includes a means for assigning an identification number or a known set of numbers to the parts of the customer order, particularly the film and the customer envelope, and for placing that number in human-readable form on the film and the envelope. An optical character reader is provided to read the identifying code from the film splice and that information is used to drive a means that encodes the identifying number or at least a portion thereof on the photographic prints that are produced from the developed film. The print-marking may preferably be accomplished by control of a punch conventionally used to indicate the boundaries between successive prints on the exposed photographic paper web to achieve an encoding of the identification number by position of punch marks.

A packaging station receives the photographic prints, the filmstrips, and the envelope. An optical character reader positioned in the film track of a film cutter reads the identifying number from the film splice joining adjacent filmstrips at the same time the prints are being checked, prior to their separation into individual prints at the print cutter to ensure a match with the order envelope. The order envelope is also scanned by an optical character reader or bar code reader, depending on the chosen method, to ascertain the identifying code from the envelope and ensure that it matches with the identifying codes read from the photographic prints and the film splice. It should be understood that the numbers used in matching may be literally identical on each part of the order, or that they may be different, with the corresponding sets of numbers stored for later use at packaging. In particular, numbers already printed on the order envelope in bar-coded form may be used as one part of the matching pair with each film identification number. In this case, printing on the order envelope of a human-readable number identical to that assigned to the film splice is an added security measure to allow manual sorting independent of any automated equipment or the use of data storage records of order matches. The information read from the parts of the order is fed to a data processor that keeps a running tally of the nonreads, misreads, and correct matches that are found in processing sequential film orders. The data processor develops an alarm signal based on the information it receives from the readers and activates an alarm that requires operator intervention in the event that the data processor determines that an unacceptable number of misreads, nonreads, or alleged errors in matching have occurred.

BRIEF DESCRIPTION OF THE DRAWINGS

The invention will be better understood by those of ordinary skill in the art and others upon reading the ensuing specification, taken in conjunction with the appended drawings, wherein.

DETAILED DESCRIPTION OF THE PREFERRED EMBODIMENT

Figure 1:
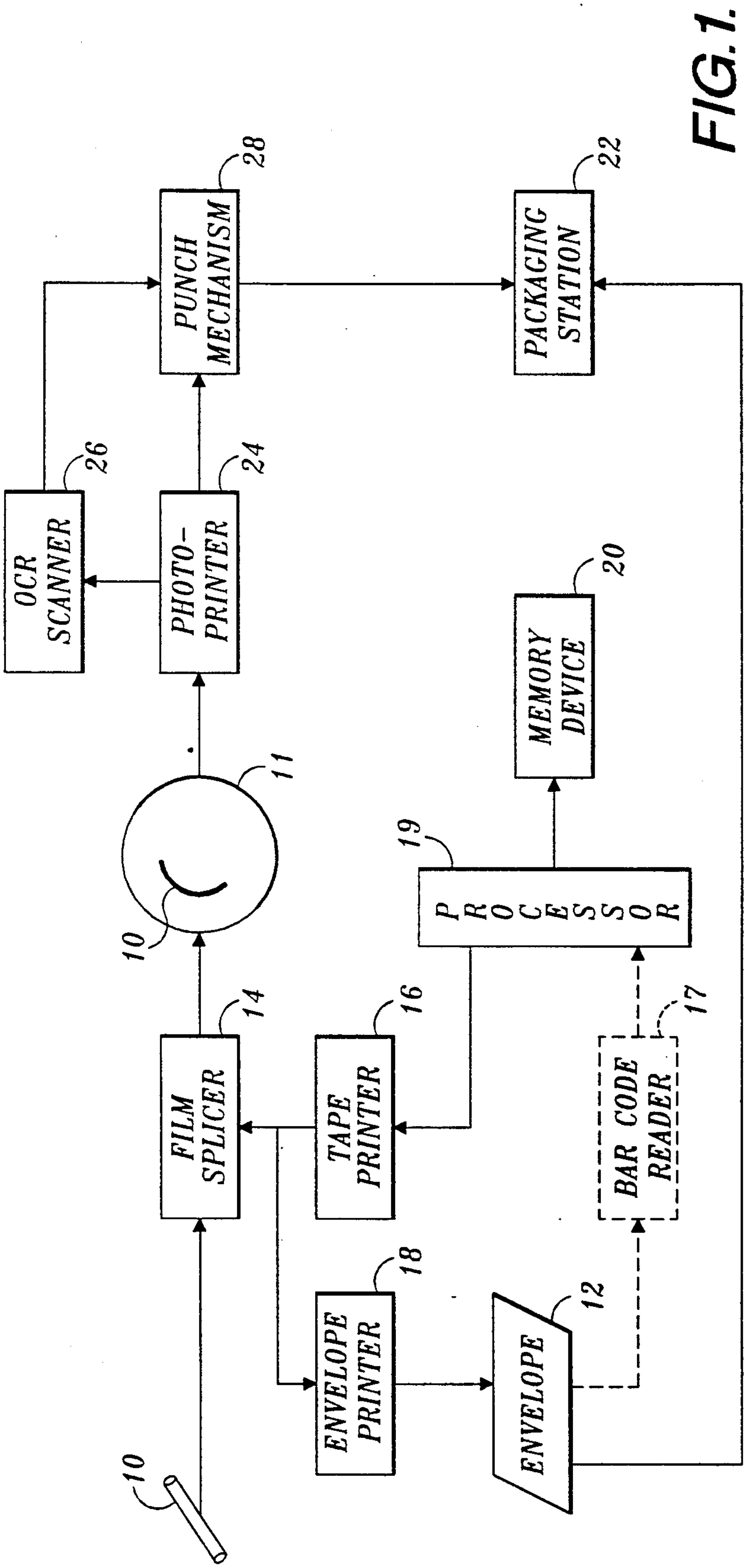
FIG. 1 is a block diagram of a photofinishing order-processing system utilizing optical character readers to read identifying codes on various parts of the order.

A photofinishing system is shown in FIG. 1, in block diagram form, that can be used to implement the order-matching method of the present invention. A roll of film 10 is brought into the lab in an envelope 12. The envelope bears information regarding the customer submitting the order and, also, contains information regarding the dealer, such as a drugstore or supermarket, to which the customer originally brought the film and which has, in turn, sent the film to the photofinishing lab. After the film is removed from the envelope it is placed into a splicer 14 where the film is removed from the roll and joined with other films to form a continuous web 11. The films are joined together by paper splice tapes adhesively secured to the trailing end of a first film and the leading end of a second film. An identifying number is typically placed on the splice tape to identify one of the films to which it is attached. In most cases the splice tape identifies the film that follows it; however, with certain adaptations to the control systems, the splice tape could also be utilized to identify the film that is ahead of it.

In the method of the present invention the splice tape is received by the film-processing lab on a continuous reel and is unmarked. The splicer 14 includes a printer 16 that is capable of printing a number on a segment of the splice tape, which is then severed from the reel and used to join films in the splicer. In the described embodiment, each succeeding segment of splice tape will have a number printed on it that increments by one from the previous number. The number is printed on the splice tape in human-readable form. The number that is printed on the splice tape identifying the film being processed must somehow be correlated to the customer envelope 12 so that the envelope, which is the only item that bears the information regarding the identity of the film's owner, can be matched to the film after processing.

The most straightforward manner of correlating the film to the envelope is to have an envelope printer 18 included in the splicer that prints the same number on the envelope 12 that was printed on the splice tape associated with the subject filmstrip. Since the envelopes are typically manually positioned in the printer 18, the precise location of the identifying number that is printed will vary somewhat, which will present some difficulty later on when the envelope is presented to an automatic reader for reading the identification number on the envelope to ascertain whether or not it matches with the filmstrip. Therefore, an alternative procedure for identifying the envelope 12 can be used. The alternative method relies on use of preprinted envelope identification and dealer identification numbers that are present on the envelope. In this alternate method the envelope identification number is read with the use of a bar code scanner 17 and this information is fed to a processor 19 for storage on a memory device 20, such as a disk or tape. Alternatively, the information could be fed directly to a central processing computer (not shown) in the laboratory. Simultaneously, the identification number that has been printed on the splice tape is also relayed to the processor 19 for entry on the same memory device 20 or in the memory of the same central processor so that a table is established correlating each film-identifying number to an associated envelope identification number. Later this table can be used to determine whether the proper envelope and film have been matched at a packaging station 22. In the case of a memory device, such as a disk or tape, that memory device can be taken from the processor 19 at the input end of the laboratory and inserted into a second processor at the packaging station at the output end of the laboratory for the final matching check before order reassembly. If a central lab processing computer is utilized, then no physical transfer of the memory device is required and the packaging station 22 will simply access the central processing computer's memory to scan the established table and determine the correct numbers for a match.

Referring back to FIG. 1, once the filmstrips 10 have been spliced into the web 11 and each film marked with an identifying number by means of the printing on the splice tape joining adjacent films, the film web 11 is subjected to chemical processing required to develop the film and then is sent on to a photo-printer 24 for printing of the photographic positives. At the same time, the envelope 12, along with the other envelopes in its batch, is forwarded on to a holding location awaiting the arrival of the developed and printed film 10 at the packaging station 22. The packaging station 22 is made up of several elements, as shown in FIG. 2.

At the photoprinter 24 an optical character reader 26 scans the film splice and sends the information from the film splice to a punch mechanism 28, which is used to encode at least a portion of the identifying number on the edges of the strip of prints that has been made from the film 10. Such encoding is combined with the punch marks commonly used for indicating the location of individual prints. After the film has been printed it is sent to the packaging station 22 where it is reunited with the batch of envelopes from which the film 10 was originally taken and the reel of prints that has been made from the various film-strips. At the packaging station 22 the filmstrips are separated from one another; the prints are cut into individual units; and the film and prints are packaged and placed back in the customer envelope for return to the customer. As the various parts are assembled, the identification numbers are checked again to make certain that the correct orders are being put together for return to the customer.

Figure 2:
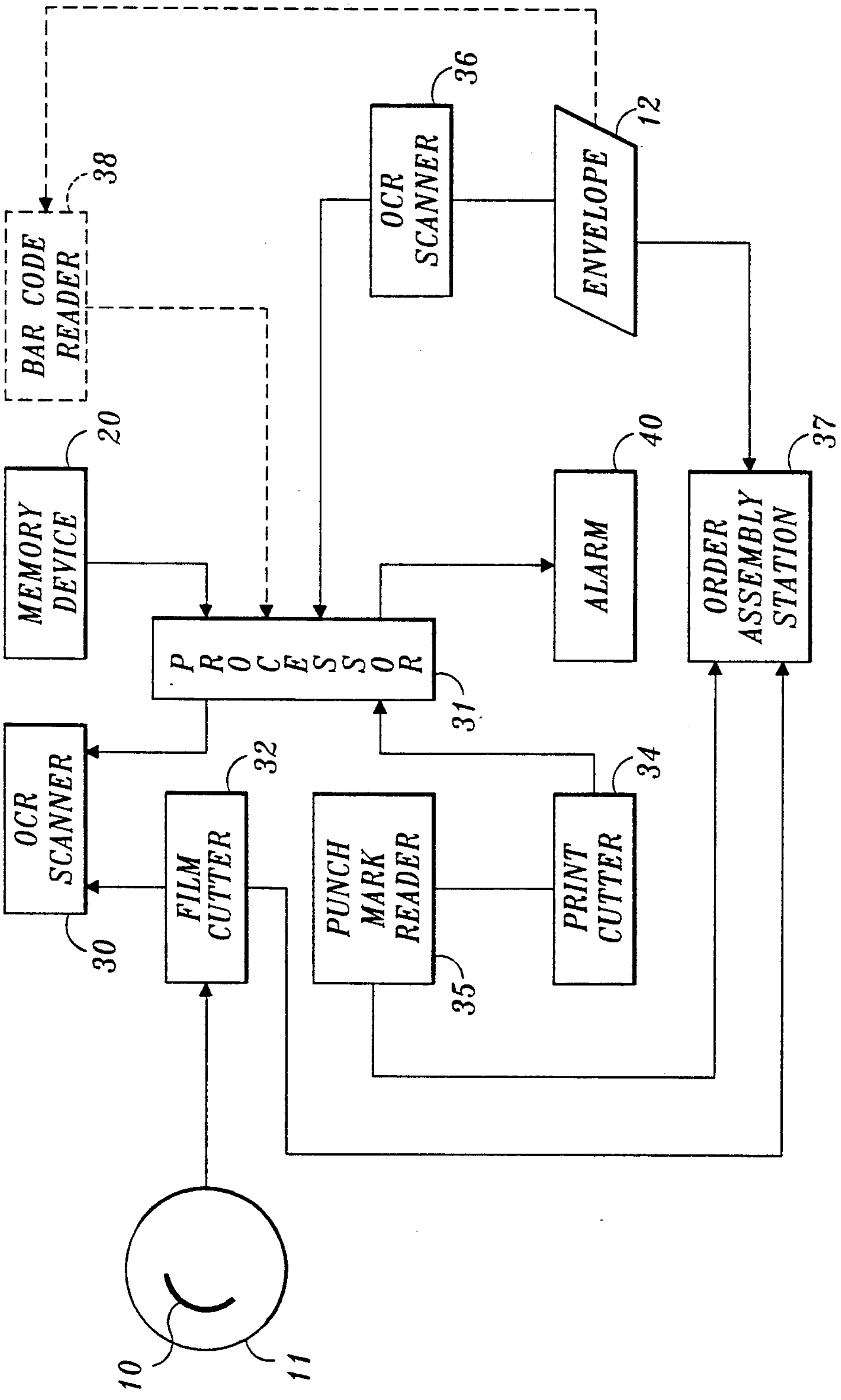
FIG. 2 is a block diagram of the packaging station that forms a portion of the photoprocessing system shown in FIG. 1.

Referring to FIG. 2, the packaging station 22 is shown in greater detail and it can be seen that an optical character reader 30 is associated with a film cutter 32 and reads the identifying number present on the film splice at about the time that the individual filmstrip 10 is separated from the web 11. At the same time a punch mark reader 34 associated with a print cutter 35 reads the punched edges of the prints to determine what identifying number is present thereon. After separation of the individual prints, the prints and filmstrips are moved to an order assembly station 37 where they will be packaged and placed in order envelope 12 for return to the customer. The envelope 12 must also be identified and the means of identification will vary, depending on whether the straightforward method described above or the alternative method was originally used to maintain envelope identification. If the straightforward method was used, in which the same number that is printed on the splice tape is used to identify the envelope, then an optical character reader 36 can be used to scan that number on the envelope 12 and compare it to the number that has been read from the film 10 and the associated prints. Depending on the accuracy with which the number can be placed on the envelope and the accuracy with which the envelope can be placed in the reader, it would be possible to have the optical character reader stationarily positioned in the packaging station. However, due to the variance in position of the number as it is printed on the envelope and difficulty in positioning the envelope at the packaging station accurately enough to accomplish the optical character reading, it is more likely that a hand-held scanner would be used by the operator to scan the envelopes and determine the film identification number that was printed on the envelope.

If the alternative method described earlier was used, then a bar code scanner 38 (shown in phantom line) can be used to scan the envelope 12 for the preprinted dealer identification number on the envelope and feed that information to the processor 31. The number read from the splice by optical character reader 30 is also fed to the processor 31 and a table is established that correlates envelope number to film-identifying number. The table is then compared to the table that was developed when the film was received at the lab to determine if the film and envelope numbers read at the packaging station compare to the film identification number and envelope number that were read at the splicer. If the film and envelope are correctly matched then the numbers should correspond to those in the table present in the processor or in the memory device 20 that has been loaded into the processor. In the event that the numbers on the film, prints, and envelope all match, the operation continues on as successive orders are assembled. However, if a mismatch is detected, then something must be done to either assure that the mismatch is only an apparent one or stop the processing and correct any problems that have arisen to cause an actual mismatch. If the mismatch is determined to be an actual one, the processor 31 will cause activation of an alarm 40. The alarm 40 can be any audible or visible alarm and will trigger a stop in the lab workflow.

Because of the inherent difficulty in using optical character readers to read plain text numbers, a higher percentage of incorrect reads of digits in the numbers will occur than were previously experienced using bar codes. Therefore, it is necessary to filter out the misreads and nonreads and interrupt the packaging operation only in the event that an actual mismatch occurs. It is also true that the filter must not be so wide that it allows a large number of actual mismatches to be processed through the system before an intervention alarm is given.

One method of handling the problem is to weight the significance given to a misread or a mismatch, depending on the location of the digit that is either not read or does not match within the total identifying number. Since, in the preferred embodiment, the identifying numbers that are printed on the splice tapes are sequential numbers that change by one increment for each film, it will be apparent that the least significant digit should change with each successive order. Therefore, a nonread or apparent mismatch that occurs in the least significant digit will be treated as having much more importance than a nonread or apparent mismatch that occurs in a higher order digit. While it is true that a mismatch in a higher order digit may be an actual mismatch and not just an apparent one, the probability of an actual mismatch in a higher order digit is much less than that of an apparent mismatch in a least significant digit being an actual mismatch. Also, the frequency with which a given number appears in the higher order digits will vary. For example, the lower numbers of zero through, say, four of five occur statistically more often than the higher order numbers eight and nine, since with each succeeding batch the numbering restarts with the lower numbers. Therefore, it is possible also to assign a different weight to an apparent mismatch involving a lower order number, such as one or two, than to a higher order number, such as eight or nine.

An additional consideration when using optical character readers is that certain number substitutions are more likely to occur than others. For example, it is not uncommon for the number "3" to be misread as an "8" or vice versa or, likewise, for a number "7" to be misread as a number "1". Therefore, a lower weight is given to an apparent mismatch involving the numbers with the highest probability of substitution than, for example, an apparent mismatch between the numbers "3" and "7".

Since the film orders are primarily kept in the correct sequence by their physical position during processing, the presence of a correctly matched order is a good indicator that several orders ahead of and behind that correctly matched order were also correctly matched. Typically, if a problem occurs during the processing that results in the wrong film, for example, appearing at the packaging station for a given envelope or a set of prints, it will typically be true that all the following orders will also be incorrect because the entire batch sequence has slipped one or two places. Therefore, the presence of a correctly matched order should be used in the present system as a reset to provide the operator with a check that the integrity of the batch is currently in order. The system contemplated for utilizing some of the features described above would, for example, set a maximum error count that must be reached before an intervention alarm is given. Certain situations would then be assigned a weight based on the probability that they indicate an actual mismatch and a sum of these weights would be kept. An intervention alarm would occur only when that sum reached the alarm limit.

If a correct match occurs between all the parts of an order, the mismatch error weight sum and nonread error weight sum are decreased by a predetermined decrement. The nonread error weight sum could be decreased by setting it to zero each time a correct match occurs.

An example of the types of situations that are dealt with in this scheme is in the case of nonreads of one or more digits in one of the identifying numbers. Since more nonreads will occur using an optical character reader than would statistically occur with a bar code reader, it is possible to give less significance to a nonread than to an apparent mismatch. In the following example, a series of ten orders is shown with the number read from the film and the number read from the envelope shown in the second and third columns, respectively. The "calculated status" column is an indicator of the running total of nonreads and mismatches and the final column shows the external action to be taken based on that status total. In this example, the nonread limit is equal to three and the mismatch limit is equal to two. Also, a combination limit is defined from the sum of nonread and mismatch limits. This is set at 3 in the example. "N" equals a nonread count; "M" equals a mismatch count; and different weights are given to nonreads in relationship to their position in the number. In this specific example, a least significant digit nonread is given a weight of one while a second digit nonread is given a weight of only 0.5. Nonreads in digits higher than the second digit are completely ignored.

| Order | Film No. | Envelope No. | Calculated Status | Action |
|---|---|---|---|---|
| 1 | 21556 | 21556 | OK | none |
| 2 | 21557 | 215?7 | 0.5 N | none |
| 3 | 21553 | ?1558 | 1 M, 0.5 N | none |
| 4 | 2??59 | 21??9 | 1 M, 1 N | none |
| 5 | 21560 | 21560 | clear | none |
| 6 | 21?61 | 21561 | OK | none |
| 7 | ?156? | ????? | 2.5 N | none |
| 8 | 2?563 | 21563 | clear | none |
| 9 | ??565 | 21564 | 1 M | none |
| 10 | ?1566 | 2??65 | 2 M | alarm |

N = Nonread
M = Mismatch

Nonread status limit=3; mismatch limit=2; combined limit=3.

The above example is meant to be representative of only one possible scheme of handling the numbers as read by the optical character reader. Once a system was operating in a lab the operator could adjust the alarm limits and the assigned weights for various digits, based on empirical studies of what will and will not work in the laboratory. In the example, it will be noted that an apparent mismatch at order number 3 did not result in any alarm and eventually the status was cleared by a correct match in order number 5. An actual mismatch that showed up in order number 9 did not cause an alarm until a second consecutive mismatch appeared in order number 10. Therefore, two mismatched orders were found before an alarm was given but no false alarms were given. It will be incumbent upon the operator of a given laboratory to determine where to set the alarm limits in a balance between how many actual mismatches can be absorbed in relation to how many false alarms can be tolerated, since either will interrupt operations but the false alarms will interrupt operations for no good reason. In current systems that utilize operator visual inspection of orders in order to determine when mismatches occur, it is typical for every tenth order to be checked and in those situations it is therefore possible that ten orders could go by before a mismatch is found. Therefore, even the elementary example given above has the potential of bringing that number down to a mere two mismatches before an alarm is given with the benefit that no false alarms have occurred in the meantime.

Figure 3:
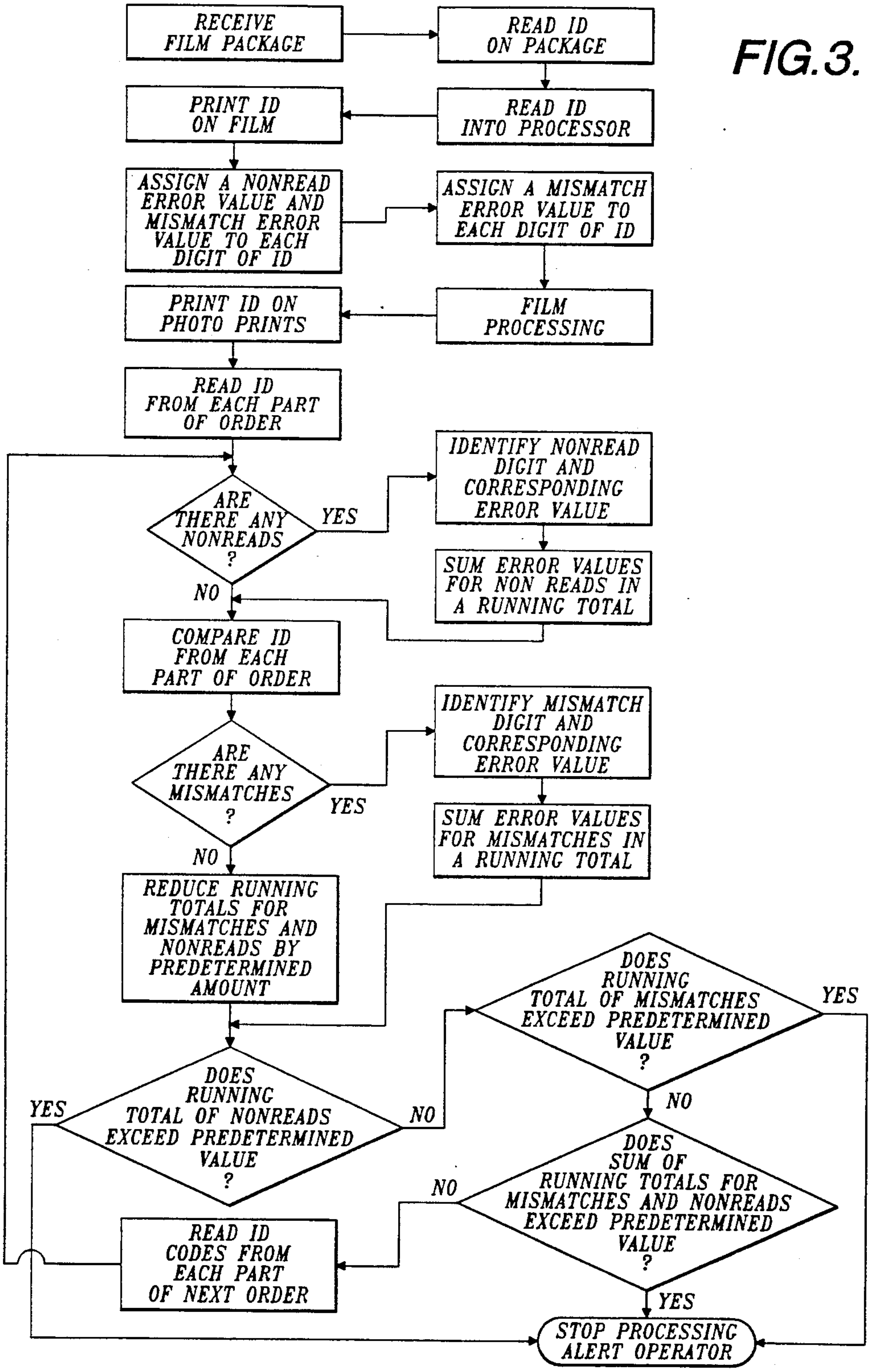
FIG. 3 is a block diagram of the method of checking correlation between parts of a photofinishing order through the use of error weights.

FIG. 3 is a flow chart that graphically represents the steps of the method of correlation described above for the situation in which a film package is received at the lab bearing a preprinted identification number. The ID number is read from the package and printed by conventional means onto the film that was in the package. Nonread and mismatch error weights are assigned to the digits of the ID number and the film is sent to processing.

After the film is developed and prints made, the ID number is printed on the photoprints. The parts of the order, namely, package, film, and prints, are read to obtain the ID number from each part. The data obtained is analyzed for nonreads of digits. If there are any nonread digits, the corresponding nonread error weights are summed in a running total over the series of orders being processed.

The ID numbers read from the parts of the order are then compared. If any digits do not match, the corresponding mismatch error weights are summed in a running total over the series of orders being processed. If all of the digits read match, the running totals for the mismatch error weights and nonread error weights are reduced by a predetermined amount. If, after comparing the parts of the order, the running total of the nonread error weights exceeds a predetermined value or the running total of the mismatch error weights exceeds a predetermined value or a sum of the running totals of the mismatch error weights and nonread error weights exceeds a predetermined value, the operator is alerted and film processing is stopped. If none of the running totals exceeds a predetermined value, film processing continues and the ID codes are read for each part of the next order.

It will be apparent to those of ordinary skill in the art and others that a system of order matching for use in a commercial photofinishing lab has been described and illustrated. The system uses optical character readers to read plain text numbers printed on the order envelope and the film splices in order to provide a check as to whether or not the correct parts of any given order have been assembled at a packaging station, prior to the return of the order to the customer. In one embodiment, all of the identifying numbers on the film and envelopes are read using an optical character reader and matched directly, whereas, in an alternative embodiment, the envelope number is read by a bar code scanner and, instead of being matched directly to the film number, is matched to a table that has been constructed in a memory device or central processor that keeps a table of corresponding film numbers and envelope numbers. Due to the inherent inconsistencies in reading that occur when using optical character readers, particularly with plain text numbers, a method of handling the optical character reader information has been disclosed that will minimize the number of false alarms that occur for apparent mismatches, which are really misreads or nonreads caused by these inherent problems with optical character readers. At the same time, the method minimizes the number of actual mismatches that will occur before operator intervention is called for. It will be understood that the illustrated and described embodiment is meant to be exemplary only and not limiting and that the invention should be defined solely with reference to the appended claims.

The embodiments of the invention in which an exclusive property or privilege is claimed are defined as follows:

1. A method of checking correlation between multiple parts of a series of photofinishing orders during processing, comprising the steps of:

(a) assigning a multidigit control number to each order of said series of orders, wherein said multidigit control number changes with each order in the series;

(b) printing said multidigit control number on each part of each order;

(c) reading the multidigit control number from each part of each order;

(d) assigning a nonread error weight to each digit of said multidigit control number according to its position in the multidigit number, with a most frequently changing digit being weighted more than those digits that change with lesser frequency;

(e) comparing the multidigit control number read from each part of each order in order to match corresponding parts of each order;

(f) while comparing the multidigit control number read from each part of each order, monitoring whether a nonread occurs for each digit of said multidigit control number and summing the error weights corresponding to each nonread in a running total over the series of orders; and (g) initiating corrective action if the running total of the nonread error weights exceeds a predetermined sum.

2. The method of claim 1, further including the steps of:

(a) assigning a mismatch error weight to each digit of said multidigit control number; and (b) during the step of comparing the multidigit control number read from each part of each order, monitoring whether a mismatch error occurs for each digit of said multidigit control number and summing the corresponding mismatch error weights in a running total over the series of orders and wherein the initiating step further comprises initiating said corrective action if at least one of the running total of the nonread error weights and the running total of the mismatch error weights exceeds a predetermined sum.

3. The method of claim 1, including the step of, after comparing the multidigit control numbers from each part of one order, decreasing the running total of the nonread error weights by a predetermined decrement if a correct match occurs between all the parts of said one order.

4. The method of claim 2, further including the step of decreasing the running total of the mismatch error weights by a predetermined decrement each time a correct match occurs between all the parts of one order.

5. The method of claim 1, including the step of, after comparing the multidigit control numbers from each part of one order, setting the running total of the nonread error weights to zero each time a correct match occurs between all the parts of said one order.

6. The method of claim 1, wherein the most frequently changing digit is a least significant digit.

7. The method of claim 2, further including the step of developing a combined sum of the running total of the nonread error weights and the running total of the mismatch error weights and wherein the initiating step further comprises initiating the corrective action if at least one of the running total of the nonread error weights, the running total of the mismatch error weights and the combined sum exceeds a predetermined value.

8. The method of claim 1, wherein at least one part of an order includes a preexisting identification number, associated with a customer, in a bar code format and wherein the method includes the step of reading the identification number with a bar code scanner and using the identification number as the multidigit control number for said order.

9. The method of claim 8, further including the steps of:

storing the identification number read from said at least one part of said order in a memory device;

storing a customer's identity associated with said identification number in said memory device;

developing a correlation table between said identification number and said customer's identity; and using said correlation table to match parts of one order with the customer.

10. The method of claim 2, wherein said mismatch error weights assigned to said digits of said multidigit control number are weighted more for a most frequently changing digit of said multidigit control number than for those digits that change with lesser frequency.

11. The method of claim 1, wherein said multidigit control number is printed in human-readable form on at least one part of one order and is read from said at least one part using an optical character reader.

* * * * *